(12) United States Patent
Panther et al.

(10) Patent No.: US 10,379,548 B2
(45) Date of Patent: Aug. 13, 2019

(54) SYSTEM AND METHOD FOR CONTROLLING A VALVE

(71) Applicant: FISHER CONTROLS INTERNATIONAL LLC, Marshalltown, IA (US)

(72) Inventors: Mitchell Stephen Panther, Marshalltown, IA (US); Michael Anthony Conger, Bluegrass, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 664 days.

(21) Appl. No.: 14/520,877

(22) Filed: Oct. 22, 2014

(65) Prior Publication Data

US 2015/0112492 A1 Apr. 23, 2015

Related U.S. Application Data

(60) Provisional application No. 61/894,254, filed on Oct. 22, 2013.

(51) Int. Cl.
*G05D 7/06* (2006.01)
*G05B 15/02* (2006.01)
(Continued)

(52) U.S. Cl.
CPC ......... *G05D 7/0635* (2013.01); *F15B 13/043* (2013.01); *F15B 13/0431* (2013.01); *G05B 15/02* (2013.01); *H04L 67/10* (2013.01)

(58) Field of Classification Search
CPC ... G05D 7/0635; H04L 67/10; F15B 13/0431; F15B 13/043; G05B 15/02
See application file for complete search history.

(56) References Cited

U.S. PATENT DOCUMENTS 3,848,676 A * 11/1974 Doherty, Jr. ........... A62C 37/08
169/37
4,113,174 A * 9/1978 Kagiyama .......... G05D 23/1858
236/12.11

(Continued)

FOREIGN PATENT DOCUMENTS

| EP | 2 179 902 | 4/2010 |
|---|---|---|
| EP | 2530334 A1 | 12/2012 |
| WO | WO-02/17028 | 2/2002 |

OTHER PUBLICATIONS

International Search Report and Written Opinion for corresponding International application No. PCT/US2014/061671, dated Mar. 3, 2015.

(Continued)

*Primary Examiner* — Carlos R Ortiz Rodriguez
(74) *Attorney, Agent, or Firm* — Marshall, Gerstein & Borun LLP

(57) ABSTRACT

A system and method for controlling a remote valve includes temporarily driving or activating a battery-powered pilot valve assembly to place an operatively coupled output valve in a switch position. One or more processors receives a temperature measurement associated with an operating environment of the battery-powered pilot valve assembly, compares the received temperature measurement to a temperature threshold level, and continuously drives the battery-powered pilot valve assembly to maintain the output valve in the switch position if the temperature measurement is below the temperature threshold level.

23 Claims, 3 Drawing Sheets

(51) Int. Cl.
*H04L 29/08* (2006.01)
*F15B 13/043* (2006.01)

(56) References Cited

U.S. PATENT DOCUMENTS

| | | | |
|---|---|---|---|
| 4,561,470 A | | 12/1985 | Bezard et al. |
| 4,811,221 A | * | 3/1989 | Sturman .............. G05B 19/0426 |
| | | | 137/624.12 |
| 6,685,159 B1 | * | 2/2004 | Schnell ............... F15B 13/0426 |
| | | | 251/129.04 |
| 2012/0167996 A1 | | 7/2012 | Pathak et al. |
| 2013/0068309 A1 | | 3/2013 | Anderson |
| 2013/0087223 A1 | | 4/2013 | Ozzello |
| 2013/0103989 A1 | | 4/2013 | Jensen |

OTHER PUBLICATIONS

Notice of Allowance for U.S. Appl. No. 14/169,916 dated Apr. 21, 2016.

International Search Report and Written Opinion of a related International application No. PCT/US2014/061674, dated Feb. 11, 2015.

"Improving Process Efficiency With Wireless Valve Automation," Kurtis Jensen, Valve Magazine, Valve Manufacturers Association, Fall 2012, 3 pages.

"TopWorx™ 4310 Wireless Position Monitor," Product Bulletin 62.3:4310, Nov. 2012, 12 pages.

"TopWorx™ 4310 Wireless Position Monitor, with On/Off Control Option," Instruction Manual, 4310 Position Monitor, Oct. 2012, 64 pages.

"Fisher® 4320 Wireless Position Monitor," Product Bulletin 62.3:4320, Nov. 2012, 12 pages.

"Fisher® 4320 Wireless Position Monitor, with On/Off Control Option," Instruction Manual, 4320 Position Monitor, Oct. 2012, 64 pages.

Press Release, "Emerson Introduces Wireless Position Monitor with On/Off Control for Discrete Valves," http://www2.emersonprocess.com/en-US/news/pr/Pages/1210-Fisher4320.aspx 2 pages (Jan. 22, 2015).

International Preliminary Report on Patentability and Written Opinion for corresponding International application No. PCT/US2014/061674, dated Apr. 26, 2016.

* cited by examiner

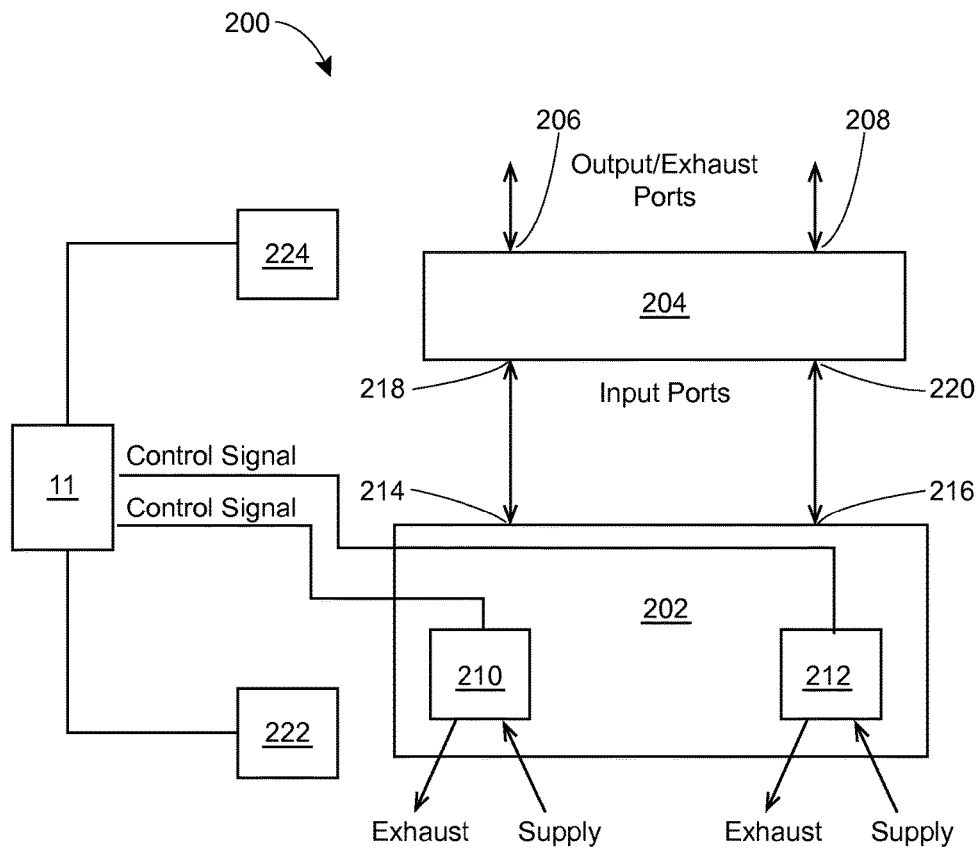
FIG. 2A
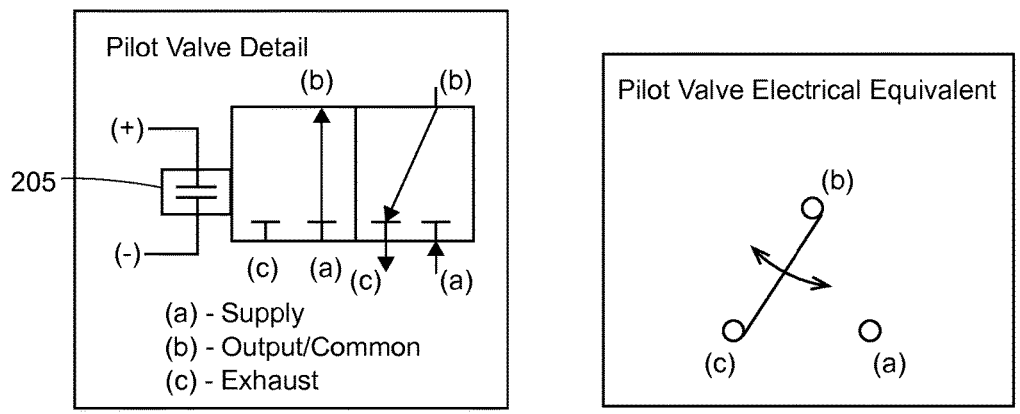
FIG. 2B  FIG. 2C

SYSTEM AND METHOD FOR CONTROLLING A VALVE

RELATED PATENT APPLICATIONS

This patent application claims the filing benefit of U.S. Provisional Patent Application No. 61/894,254, filed Oct. 22, 2013; the contents of which are herein incorporated by reference.

FIELD OF THE DISCLOSURE

The present disclosure is directed to process control systems and, more particularly, to controlling a battery-powered valve.

BACKGROUND

Process control systems, such as distributed or scalable process control systems like those used in chemical, petroleum or other processes, typically include one or more process controllers communicatively coupled to at least one host or user workstation and to one or more field devices via analog, digital, or combined analog/digital buses. The field devices, which may include, for example, control valves, valve positioners, switches, and transmitters (for example, temperature, pressure, and flow rate sensors), perform functions within the process such as opening or closing valves and measuring process parameters. The process controller receives signals indicative of process measurements made by the field devices and/or other information pertaining to the field devices, and uses this information to implement a control routine to generate control signals, which are sent over the buses to the field devices to control the operation of the process. Information from each of the field devices and the controller is typically made available to one or more applications executed by the user workstation to enable an operator to perform any desired function regarding the process, such as viewing the current state of the process and/or modifying the operation of the process. In the event that a field device fails, the operational state of the entire process control system can be jeopardized.

SUMMARY

One aspect of the present disclosure is directed to a method for controlling a remote pneumatically operated valve implemented within a process control system. The method includes temporarily driving or activating a battery-powered pilot valve assembly to place an operatively coupled output valve in a switch position, receiving a temperature measurement associated with an operating environment of the battery-powered pilot valve assembly, determining if the temperature measurement is below a temperature threshold level, and continuously driving or activating the battery-powered pilot valve assembly to maintain the output valve in the switch position if the temperature measurement is below the temperature threshold level.

Another aspect of the present disclosure includes a method for controlling a remote pneumatically operated valve implemented within a process control system. The method includes temporarily driving or activating a battery-powered pilot valve assembly to place an operatively coupled output valve in a switch position, monitoring a temperature associated with an operating environment of the battery-powered pilot valve assembly, determining if the monitored temperature is below a temperature threshold level, and continuously driving or activating the battery-powered pilot valve assembly to maintain the output valve in the switch position if the temperature measurement is below the temperature threshold level.

A further aspect of the invention is directed to a system for controlling a remote pneumatically operated valve. The system includes a battery-powered pilot valve assembly operatively coupled to an output valve, a processor operatively coupled to the battery-powered pilot valve assembly, and a memory operatively coupled to the processor. The system includes a temperature sensor operatively coupled to the processor, wherein the temperature sensor facilitates monitoring of a temperature associated with the battery-powered pilot valve assembly. The system further includes a control module stored in the memory, which when executed on the processor, temporarily drives or activates the battery-powered pilot valve assembly to place the output valve in a switch position and continuously activates the battery-powered pilot valve assembly to maintain the output valve in the switch position if the temperature is below a temperature threshold level.

A further aspect of the present disclosure includes a tangible computer readable-medium having instructions stored thereon that, when executed by one or more processors, causes the one or more processors to temporarily drive or activate a battery-powered pilot valve assembly to place an operatively coupled output valve in a switch position, receive a temperature measurement associated with an operating environment of the battery-powered pilot valve assembly, compare the received temperature measurement to a temperature threshold level, and continuously drive or activate the battery-powered pilot valve assembly to maintain the output valve in the switch position if the temperature measurement is below the temperature threshold level.

In further accordance with the inventive aspects described herein, any one or more of the foregoing embodiments may further include any one or more of the following forms.

In one form, the method includes determining if the output valve is being positioned, and ceasing continuously driving or activating the pilot valve assembly if the temperature measurement is above the temperature threshold level and the output valve is not currently being positioned.

In another form, the method includes driving or activating a first battery-powered pilot valve for a period of time to place the output valve in a first position; or driving or activating a second battery-powered pilot valve for a period of time to place the output valve in a second position.

In another form, the pilot valve assembly includes a first battery-powered pilot valve for receiving a control signal from the processor to place the output valve in a first position, and a second battery-operated pilot valve for receiving a control signal from the processor to place the output valve in a second position.

In another form, the output valve includes a rotary spool valve or a sliding spool valve.

In another form, the pilot valve is a piezoelectric valve.

In another form, the temperature threshold level is −10° C.

In another form, the period of time to temporarily transmit the control signal to drive the pilot valve assembly is three seconds.

BRIEF DESCRIPTION OF THE DRAWINGS

FIG. 2A is a schematic representation of an example control valve assembly constructed in accordance with the principles of the present disclosure.

FIG. 2B is a schematic representation of interior details of the pilot valve shown in FIG. 2A.

FIG. 2C is a schematic representation of the electrical equivalent of the pilot valve shown in FIGS. 2A and 2B.

DETAILED DESCRIPTION

Figure 1:
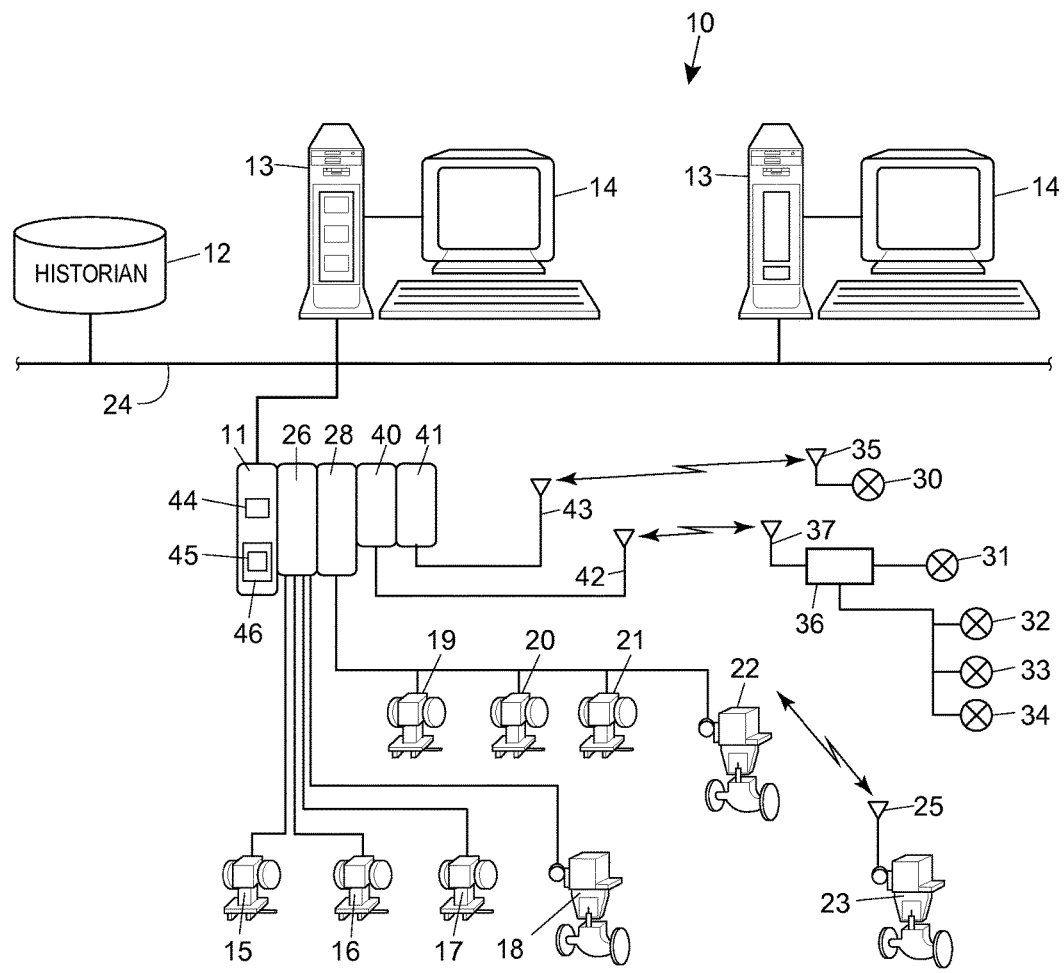
FIG. 1 is a schematic representation of an example process control system having one or more field devices constructed in accordance with the principles of the present disclosure.

Referring now to FIG. 1, a process control system 10 constructed in accordance with one version of the present disclosure is depicted incorporating one or more field devices 15, 16, 17, 18, 19, 20, 21, 22, 23 in communication with a process controller 11. The process controller 11 is communicably coupled to a data historian 12 and one or more user workstations 13. Each workstation 13 includes a user interface 14 to facilitate communication with the process control system 10. The user interface 14 may include one or more devices, such as a display screen, touch-screen, keyboard, and a mouse, for example. So configured, the controller 11 delivers signals to and receives signals from the field devices 15, 16, 17, 18, 19, 20, 21, 22, 23 and the workstations 13 to control the process control system 10.

In additional detail, the process controller 11 of the process control system 10 of the version depicted in FIG. 1 is connected via hardwired communication connections to field devices 15, 16, 17, 18, 19, 20, 21, 22 via input/output (I/O) cards 26 and 28. The data historian 12 may be any desired type of data collection unit having any desired type of memory and any desired or known software, hardware, or firmware for storing data. Moreover, while the data historian 12 is illustrated as a separate device in FIG. 1, it may instead or in addition be part of one of the workstations 13 or another computing device, such as a server. The controller 11, which may be, by way of example, a DeltaV™ controller sold by Emerson Process Management, is communicatively connected to the workstations 13 and to the data historian 12 via a communication network 24 that may be, for example, an internet or Ethernet connection.

The field devices 15, 16, 17, 18, 19, 20, 21, 22 are illustrated as being communicatively connected to the controller 11 via a hardwired communication scheme, which may include the use of any desired hardware, software, and/or firmware to implement hardwired communications, including, for example, standard 4-20 mA communications, and/or any communications using any smart communication protocol such as the FOUNDATION® Fieldbus communication protocol, the HART® communication protocol, etc. The field devices 15, 16, 17, 18, 19, 20, 21, 22 may be any types of devices, such as sensors, control valve assemblies, transmitters, positioners, for example, while the I/O cards 26 and 28 may be any types of I/O devices conforming to any desired communication or controller protocol. In the embodiment illustrated in FIG. 1, the field devices 15, 16, 17, 18 are standard 4-20 mA devices that communicate over analog lines to the I/O card 26, while the digital field devices 19, 20, 21, 22 can be smart devices, such as HART® communicating devices and Fieldbus field devices that communicate over a digital bus to the I/O card 28 using Fieldbus protocol communications. Of course, the field devices 15, 16, 17, 18, 19, 20, 21, 22 may conform to any other desired standard(s) or protocols, including any standards or protocols developed in the future.

The process control system 10 depicted in FIG. 1 also includes a number of wireless field devices 23, 30, 31, 32, 33, 34 disposed in the plant to be monitored and/or controlled. The field device 23 is depicted as a control valve assembly including, for example, a control valve, while the field devices 30, 31, 32, 33, 34 are depicted as transmitters, for example, process variable sensors. Wireless communications may be established between the controller 11 and the wireless field devices 23, 30, 31, 32, 33, 34 using any desired wireless communication equipment, including hardware, software, firmware, or any combination thereof now known or later developed. In the version illustrated in FIG. 1, an antenna 25 is coupled to the control valve assembly 23 to perform wireless communications for the control valve assembly 23. Likewise, an antenna 35 is coupled to and is dedicated to facilitate wireless communications for the transmitter 30, while a wireless router or other module 36 having an antenna 37 is coupled to collectively coordinate wireless communications for the transmitters 31, 32, 33, 34. The field devices or associated hardware 23, 30, 31, 32, 33, 34, 36 may implement protocol stack operations used by an appropriate wireless communication protocol to receive, decode, route, encode, and send wireless signals via the antennas 25, 35, 37 to implement wireless communications between the process controller 11 and the control valve assembly 23 and the transmitters 30, 31, 32, 33, 34.

If desired, the control valve assembly 23 may provide measurements made by sensors within the control valve assembly 23 or may provide other data generated by or computed by the control valve assembly 23 to the controller 11 as part of its operation. Of course, as is known, the control valve assembly 23 may also receive control signals from the controller 11 to effect physical parameters, for example, flow, within the overall process. Additionally, the transmitters 30, 31, 32, 33, 34 may constitute the sole link between various process sensors (transmitters) and the process controller 11 and, as such, are relied upon to send accurate signals to the controller 11 to ensure that process performance is not compromised. The transmitters 30, 31, 32, 33, 34 are often referred to as process variable transmitters (PVTs) and may play a significant role in the control of the overall control process.

The process controller 11 is operatively coupled to one or more I/O devices 40, 41, each connected to a respective antenna 42, 43, and the I/O devices and antennas operate as transmitters/receivers to perform wireless communications with the wireless field devices 23, 30, 31, 32, 33, 34 via one or more wireless communication networks. The wireless communications with the field devices 23, 30, 31, 32, 33, 34 may be performed using one or more known wireless communication protocols, such as the WirelessHART® protocol, the Ember protocol, a WiFi protocol, an IEEE wireless standard, etc. Still further, the I/O devices 40, 41 may implement protocol stack operations used by these communication protocols to receive, decode, route, encode, and send wireless signals via the antennas 42, 43 to implement wireless communications between the controller 11 and the control valve assembly 23 and the transmitters 30, 31, 32, 33, 34.

As illustrated in FIG. 1, the controller 11 conventionally includes one or more processors 44 that implements or oversees one or more process control and/or diagnostic routines 45 (or any module, block, or sub-routine thereof) stored in a memory 46. The process control and/or diagnostic routines 45 stored in the memory 46 may include or be associated with control loops being implemented within the process plant. Generally speaking, and as is generally known, the process controller 11 executes one or more control routines 45 and communicates with the field devices 15, 16, 17, 18, 19, 20, 21, 22, 23, 30, 31, 32, 33, 34, the user workstations 13, and the data historian 12 to control a process in any desired manner.

In one particular configuration, the remote field device 23 may include a control valve assembly that provides a fluid-type output, for example, pneumatic or hydraulic pressure. In some implementations, the field device 23 may be powered by a power source with a finite amount of energy, such as a battery, fuel cell, and a like. To conserve energy, the field device 23 may incorporate or utilize a pilot valve assembly constructed in accordance with the principles of the present disclosure for controlling an output valve via the process controller 11.

Referring now to FIGS. 2A-2C, for the sake of description, the wireless field device 23 from FIG. 1 is shown in FIG. 2A as a control valve assembly 200. The control valve assembly 200 includes a battery-powered pilot valve assembly 202 operatively coupled to an output valve 204. The output valve 204 may be a directional control valve that enables fluid to flow in and/or out different paths. The output valve 204 may include a rotary or sliding spool that is mechanically or electrically controlled inside a cylinder. Movement of the spool permits or restricts fluid flow to or from a pair of ports, for example, output ports or exhaust ports 206, 208 of the control valve assembly 200. The first output port 206 and the second output port 208 may cooperate to move an actuator in a first and second direction between a first and second position, for example, to open and close a valve. That is, when fluid flows out of the first exhaust port 206, the actuator may be moved in a first direction to a first position, and when fluids flows out of the second exhaust port 208, the actuator may be moved back, or in a second direction, to a second position.

The battery-powered pilot valve assembly 202 includes a pair of battery-powered pilot valves 210, 212 operatively coupled to a controller and a processor such as the controller 11 and the processor 44 of the control system 10 in FIG. 1. It is to be understood that although the term "battery-powered" is used to denote that the pilot valves 210, 212 are powered by a battery, other sources of stored energy are included within the description of battery-powered, such as a fuel cell, rechargeable battery, and a like. At least one pilot valve 210, 212 uses or relies on the battery to a greater extent when the pilot valve 210, 212 is "turned on," being driven, or being activated as compared to when the pilot valve 210, 212 is "turned off," not being driven, or not being activated. A piezoelectric valve may be well suited for use as one or both pilot valves 210, 212 in the battery-powered pilot valve assembly 202 because of its low power consumption characteristics; however other types of valves may also be used.

As shown in the FIG. 2B of the pilot valve detail, each pilot valve 210, 212 is operatively coupled to a battery 205. Each pilot valve 210, 212 includes a supply port (a), a common/output port (b), and an exhaust port (c). The common port (b) of a first pilot valve 210 is fluidly coupled to a first output port 214 of the pilot valve assembly 202, which is further coupled to a first input port 218 of the output valve 204. The common port (b) of a second pilot valve 212 is fluidly coupled to a second output port 216 of the pilot valve assembly 202, which is further coupled to a second input port 220 of the output valve 204.

Each pilot valve 210, 212 is also capable of receiving a control signal from the controller 11. In operation, upon receiving the control signal, the pilot valve 210, 212 may be driven or activated to connect the common port (b) to either the supply port (a) or the exhaust port (c), as shown in the pilot valve's 210, 212 electrical equivalent in FIG. 2C. For example, the battery-powered pilot valve 210, 212 may be driven or activated to connect a fluid supply present at the supply port (a) to the common port (b), which will enable the fluid supply to be provided to the respective input port 218, 220 of the output valve 204. Alternatively, each battery-powered pilot valve 210, 212 may be driven or activated to connect the common port (b) to the exhaust port (c), which will allow fluid to drain away from the output valve 204. As such, each pilot valve 210, 212 may respond to an electrical control signal to open/close pneumatic ports that will enable fluid at a supply port (a) to be provided to the output valve 204 or allow fluid to drain away from the output valve 204 to the exhaust port (c). In other words the opened/closed pneumatic ports of the pilot valve 210, 212 supply and/or exhaust compressed air to the input 218, 220 of the output valve 204, wherein the output valve 204 manipulates its output in a defined manner. The output valve 204 is able to maintain its output without the need for the pilot valve 210, 212 to provide a constant input to the output valve 204. Thus, once the output valve 204 has changed its output, the pilot valve 210, 212 no longer needs to maintain its output and the electrical control signal transmitted or supplied from the controller 11 to drive or activate the corresponding pilot valve can therefore be discontinued.

In the embodiment of the battery-powered pilot valve assembly 202 depicted in FIG. 2A, the pair of pilot valves 210, 212 are implemented within the pilot valve assembly 202. The first pilot valve 210 is driven or activated by a control signal from the controller 11, which allows a fluid supply to reach the output valve 204 and to move the output valve 204 between first and second positions. In particular, an electrical control signal may be temporarily provided to the first pilot valve 210 for a sufficient amount of time to enable the fluid supply present at the supply port (a) to reach the output valve 204 and for the output valve 204 to be properly positioned. When the output valve 204 is properly positioned, the control signal from the processor is stopped and the pilot valve 210 ceases being driven or activated and the use of electrical energy from the battery power source 205 is significantly reduced or essentially eliminated. To move and reposition the output valve 204, another control signal may be transmitted by the controller 11 to drive or activate the second pilot valve 212 for a sufficient amount of time to enable the fluid supply present at the supply port (a) to reach the output valve 204 and for the output valve 204 to be placed in another position. Similarly, when the control signal from the controller 11 is stopped or not transmitted, the pilot valve 212 ceases being driven or activated and the use of electrical energy from the battery power source 205 is significantly reduced or essentially eliminated.

The pilot valves 210, 212 of the pilot valve assembly 202 are used in conjunction with the output valve 204 to create a pneumatic output for an industrial instrument. That is, the output valve 204 may function as a secondary stage, which allows for the pilot valves 210, 212 in the pilot valve assembly 202 to only be driven or activated for brief period of time. In other words, once the output valve 204 has reacted to the output of the pilot valve assembly 202 (for example, one or both of the pilot valves 210, 212) and attained a desired position, the electrical control signal transmitted to the pilot valves 210, 212 may be stopped or discontinued because the output valve 204 is able to maintain its secondary pneumatic output without the need for the pilot valve(s) 210, 212 to maintain its output. Thus, the control valve assembly 200 provides for the temporary driving or activating of the pilot valves 210, 212 on a continual basis, which reduces energy consumption of the finite power source 205.

However, in some operating environments, the operating characteristics of the battery-powered pilot valve 210, 212 may be adversely affected wherein the output of the pilot valve 210, 212 may drift. For example, at cold temperatures, the common port (b) of the battery-powered pilot valve 210, 212 may drift from the supply port (a) to the exhaust port (c), which may allow fluid provided to the output valve 204 to drain away from the output valve 204 and thus change or affect the output valve's 204 ability to maintain its own output. That is, the common port (b) of the unpowered or non-activated pilot valve 210, 212 at cold temperatures may drift and become unintendedly coupled to the exhaust port (c), which may allow fluid to drain away from the output valve 204, which may change the output of the output valve 204. Similarly, the common port (b) of the unpowered pilot valve 210, 212 at cold temperatures may drift and become unintendedly coupled to the supply port (a), which may allow supply fluid to be provided to the output valve, 204, which may change the output of the output valve 204.

To guard against the unintended shifting of the common port (b) of inactive pilot valves 210, 212 that may contribute to a change in the output of the output valve 204 in certain operating conditions, the processor 11 may monitor the operating environment near the control valve assembly 202, such as temperature, barometric pressure, humidity, for example, via an environment condition sensor 222. In the case of monitoring temperature, when the measured temperature is less than a temperature threshold level (for example, −10° C.), the processor 11 may continuously transmit the control signal to the pilot valve assembly 202 to maintain the output 214, 216 of the pilot valve assembly 202 by continuously driving or activating one or both pilot valves 210, 212, thus maintaining the output or position of each pilot valve 210, 212 at the cold temperature, which further maintains the state of the input 218, 220 of the output valve 204, which further maintains the output or position 206, 208 of the output valve 204. Continuously driving or activating the pilot valves 210, 212 of the pilot valve assembly 202 during times when the temperature may adversely affect the operating range of the pilot valve 210, 212 will ensure that the output of the output valve 206, 208 is maintained in its last, most current position.

At temperatures above the temperature threshold level, the common port (b) of the pilot valve 210, 212 is less susceptible to drifting and the continuous driving or activating of the pilot valve 210, 212 may be discontinued. Thus, when the processor 11 determines via the temperature sensor 222 that the temperature is above the temperature threshold level, the control signal continuously provided or transmitted by the controller 11 to drive or activate the pilot valve 210, 212 may be stopped. Prior to ceasing the continuous driving or activating of the pilot valve assembly 202, or ceasing the continuous transmission of the control signal, the processor 11 may first determine whether the output valve 204 is being moved at that particular time to ensure that the output valve 204 is not prematurely stopped before reaching an intended position. The processor 11 may determine if the output valve 204 is being moved by being aware that the processor 11 is transmitting the electrical control signal to the pilot valve assembly 202. In addition, a motion sensor 224 positioned near the output valve 204 may be utilized in cooperation with the processor 11 to determine if the output valve 204 is being moved. If the output valve 204 is not being moved and the temperature is above the temperature threshold level, the processor 11 will discontinue transmitting the electrical control signal to the pilot valve 210, 212. Additionally, if the output valve 204 is being moved at the time the temperature is detected to be above the temperature threshold level, the processor 11 will allow the positioning of the output valve 204 to be completed to ensure that the output valve 204 reaches its intended position. Sometime after the output valve 204 has stopped moving, if the temperature remains above the temperature threshold level, the processor 11 will stop the continuous transmission of the electrical control signal to the pilot valve 210, 212, or stop the continuous driving of the pilot valve 210, 212, and instead provide for the temporary or continual drive or activation of the pilot valve 210, 212, as needed. Alternatively, transmission of the electrical control signal can be stopped or not provided by the controller 11 when the temperature is above the temperature threshold level independent of whether the output valve 204 is moving or not.

It is to be understood that a continuous drive of the pilot valve 210, 212 denotes an unceasing, uninterrupted drive or activation of the pilot valve 210, 212, for example, a continuous transmission of the control signal; while a temporary or continual drive of the pilot valve 210, 212 denotes an occasional, frequently repeated drive or activation of the pilot valve 210 212, for example, a discrete or occasional transmission of the control signal.

Figure 3:
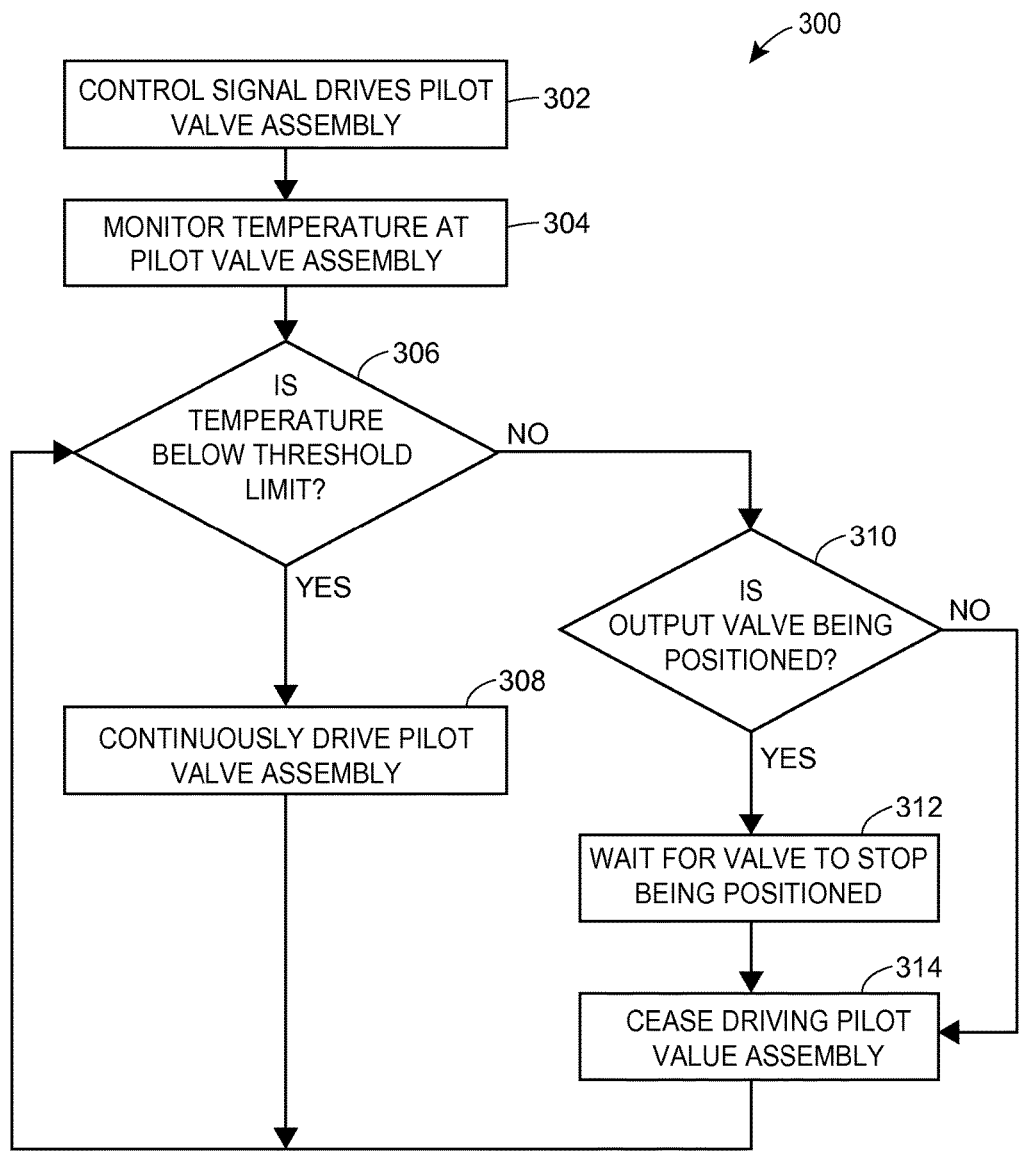
FIG. 3 is a flow diagram of an example method for controlling valve.

A flow diagram 300 of an example method for controlling a remote pneumatically controlled valve capable of being implemented in a process system depicted in FIG. 1 is shown in FIG. 3. The method may be integrated into the module 45 stored in the memory 46 and capable of being executed on the processor 44. A control signal is transmitted from the controller 11 to temporarily drive or activate a battery-powered pilot valve assembly 202 to place the output valve 204 in a switch position (block 302). The position of the output valve 204 may move or energize an actuator to open or close another valve. The temperature of the battery-powered pilot valve assembly 202 is monitored by the controller 11 via a temperature sensor 222 (block 304). The monitored temperature is compared to a temperature threshold level that may be provided by the user (block 306). If the monitored temperature is determined to be below the temperature threshold level, an electrical control signal is continuously transmitted by the controller 11 to continuously drive or activate the battery-powered pilot valve assembly 202 to ensure that the last or current position of the pilot valve 210, 212, and thus the output valve 204, is maintained (block 308). If the monitored temperature is determined to be above the temperature threshold level, the controller 11 determines whether the output valve 204 is currently being positioned (block 310). If the output valve 204 is not being moved at the time, transmission of the control signal from the controller 11 is ceased and no longer continuously drives or activates the pilot valve 210, 212 within the battery-powered pilot valve assembly 202 (block 314). However, if the output valve 204 is being positioned, the controller 11 will delay ceasing the continual transmission of the drive signal to one of the pilot valves 210, 212 until the output valve 204 has stopped moving and has been properly positioned (block 314).

It is apparent from the description above that the integrity of a control valve assembly incorporating power-saving features can be maintained in inclement conditions by utilizing an output valve in cooperation with a pilot valve assembly as described herein.

Although certain example methods, apparatus and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A method for controlling a remote pneumatically operated valve implemented within a process control system, the method comprising:
receiving, by one or more processors, a temperature measurement of an operating environment proximate a battery-powered pilot valve assembly;
determining, by the one or more processors, if the temperature measurement is above or below a temperature threshold level, wherein when the temperature measurement is above the temperature threshold,
temporarily driving, by the one or more processors, the battery-powered pilot valve assembly to place an operatively coupled output valve in a switch position;
ceasing temporarily driving, by the one or more processors, the battery powered pilot valve assembly; and wherein when the temperature measurement is below the temperature threshold,
continuously driving, by the one or more processors, the battery-powered pilot valve assembly to thereby maintain the output valve in the switch position.

2. The method of claim 1, further comprising:
detecting the temperature of the operating environment proximate the pilot valve assembly with a temperature sensor.

3. The method of claim 1, further comprising:
ceasing continuously driving, by the one or more processors, the pilot valve assembly if the temperature measurement is above the temperature threshold level.

4. The method of claim 1, further comprising:
determining, by the one or more processors, if the output valve is being positioned; and
ceasing continuously driving, by the one or more processors, the pilot valve assembly if the temperature measurement is above the temperature threshold level and the output valve is not currently being positioned.

5. The method of claim 4, wherein determining if the output valve is being positioned includes detecting movement of the output valve via a motion sensor.

6. The method of claim 1, wherein temporarily driving a battery-powered pilot valve assembly includes:
driving a first battery-powered pilot valve for a period of time to place the output valve in a first position; or
driving a second battery-powered pilot valve for a period of time to place the output valve in a second position.

7. A method for controlling a remote pneumatically operated valve implemented within a process control system, the method comprising:
monitoring, by one or more processors via an operably coupled temperature sensor, a temperature of an operating environment proximate a battery-powered pilot valve assembly;
determining, by the one or more processors, if the monitored temperature is above or below a temperature threshold level, wherein when the monitored temperature is above the temperature threshold,
temporarily driving, by the one or more processors, the battery-powered pilot valve assembly to place an operatively coupled output valve in a switch position;
ceasing temporarily driving, by the one or more processors, the battery-powered pilot valve assembly; and
wherein when the monitored temperature is below the temperature threshold,
continuously driving, by the one or more processors, the battery-powered pilot valve assembly to thereby maintain the output valve in the switch position.

8. The method of claim 7, further comprising:
detecting the temperature of the operating environment proximate the pilot valve assembly with the temperature sensor.

9. The method of claim 7, further comprising:
ceasing continuously driving, by the one or more processors, the pilot valve assembly if the temperature is above the temperature threshold level.

10. The method of claim 7, further comprising:
determining, by the one or more processors, if the output valve is being positioned; and
ceasing continuously driving, by the one or more processors, the pilot valve assembly if the temperature measurement is above the temperature threshold level and the output valve is not currently being positioned.

11. The method of claim 10, wherein determining if the output valve is being positioned includes detecting movement of the output valve via a motion sensor.

12. The method of claim 7, wherein temporarily driving a battery-powered pilot valve assembly includes:
driving a first battery-powered pilot valve for a period of time to place the output valve in a first position; or
driving a second battery-powered pilot valve for a period of time to place the output valve in a second position.

13. A system for controlling a remote pneumatically operated valve, the system comprising:
a battery-powered pilot valve assembly operatively coupled to an output valve;
one or more processors operatively coupled to the battery-powered pilot valve assembly;
a memory operatively coupled to the one or more processors;
a temperature sensor operatively coupled to the one or more processors, the temperature sensor facilitates monitoring of a temperature of an operating environment proximate the battery-powered pilot valve assembly; and
a control module stored in the memory, which when executed on the one or more processors,
determines if the monitored temperature is above or below a temperature threshold level, wherein when the monitored temperature is above the temperature threshold level,
temporarily drives the battery-powered pilot valve assembly to place the output valve in a switch position, and cease temporarily driving the battery-powered valve assembly, and
wherein when the temperature is below the temperature threshold level, continuously drives the battery-powered pilot valve assembly to thereby maintain the output valve in the switch position.

14. The system of claim 13, wherein the control module, when executed on the one or more processors, determines if the output valve is being positioned, and ceases continuously driving the pilot valve assembly if the temperature measurement is above the temperature threshold level and the output valve is not currently being positioned.

15. The system of claim 14, further comprising a motion sensor operatively coupled to the one or more processors and positioned proximate to the output valve to determine if the output valve is being positioned.

16. The system of claim 13, wherein the battery-powered pilot valve assembly includes:
   a first battery-powered pilot valve for receiving a signal from the one or more processors to place the output valve in a first position; and
   a second battery-operated pilot valve for receiving a signal from the one or more processors to place the output valve in a second position.

17. The system of claim 16, wherein the first and second pilot valves are piezoelectric valves.

18. The system of claim 13, wherein the output valve includes one of the following: a rotary spool valve, a sliding spool valve.

19. The system of claim 13, wherein the temperature threshold level is approximately −10° C.

20. The system of claim 13, wherein the time period to temporarily drive the battery-powered pilot valve assembly is approximately three seconds.

21. The system of claim 13, wherein the time period to temporarily drive the battery-powered pilot valve assembly is within a range of approximately two to approximately five seconds.

22. A tangible non-transitory computer-readable medium having instructions stored there on that, when executed by one or more processors, cause the one or more processors to:
   receive a temperature measurement of an operating environment proximate a battery-powered pilot valve assembly;
   compare the received temperature measurement to a temperature threshold level, wherein when the temperature measurement is above the temperature threshold
   temporarily drive the battery-powered pilot valve assembly to place an operatively coupled output valve in a switch position;
   cease to temporarily drive the battery powered pilot valve assembly; and
   wherein when the temperature measurement is below the temperature threshold,
   continuously activate the battery-powered pilot valve assembly to thereby maintain the output valve in the switch position.

23. The tangible non-transitory computer-readable medium of claim 22, further comprising instructions that cause one or more processors to cease to continuously activate the pilot valve assembly if the temperature measurement is above the temperature threshold level.

* * * * *